(12) United States Patent
Burckel et al.

(10) Patent No.: US 11,378,043 B2
(45) Date of Patent: Jul. 5, 2022

(54) INTAKE MANIFOLD WITH IN-BUILT HEAT EXCHANGER

(71) Applicant: SOGEFI AIR & COOLING, Guyancourt (FR)

(72) Inventors: François Burckel, Villers-le-Lac (FR); Nicolas Becker, Porte-du-Ried (FR); Benoît Ancel, Eguisheim (FR); Michel Andres, Mulhouse (FR)

(73) Assignee: SOGEFI AIR & COOLING, Guyancourt (FR)

( * ) Notice: Subject to any disclaimer, the term of this patent is extended or adjusted under 35 U.S.C. 154(b) by 795 days.

(21) Appl. No.: 16/319,773

(22) PCT Filed: Jul. 27, 2017

(86) PCT No.: PCT/FR2017/052113
§ 371 (c)(1),
(2) Date: Jan. 22, 2019

(87) PCT Pub. No.: WO2018/020172
PCT Pub. Date: Feb. 1, 2018

(65) Prior Publication Data
US 2021/0285408 A1 Sep. 16, 2021

(30) Foreign Application Priority Data

Jul. 29, 2016 (FR) ..................................... 1670418

(51) Int. Cl.
*F02M 31/20* (2006.01)
*F02M 35/104* (2006.01)
(Continued)

(52) U.S. Cl.
CPC .......... *F02M 31/20* (2013.01); *F02M 35/104* (2013.01); *F16L 41/086* (2013.01);
(Continued)

(58) Field of Classification Search
CPC ..... F02M 31/20; F02M 35/104; F28F 9/0256; F28F 21/06; F28F 2225/02;
(Continued)

(56) References Cited

U.S. PATENT DOCUMENTS 3,910,608 A * 10/1975 Phillips, Jr. ........... F16L 41/086
285/19
6,056,045 A    5/2000 Kalbacher
(Continued)

FOREIGN PATENT DOCUMENTS

DE        196 44 337 A1    4/1998
DE   10 2009 039569 A1    3/2011
(Continued)

OTHER PUBLICATIONS

International Search Report, dated Oct. 11, 2017, from corresponding PCT/FR2017/052113 application.

*Primary Examiner* — Jon T. Schermerhorn, Jr.
(74) *Attorney, Agent, or Firm* — Nixon & Vanderhye

(57) ABSTRACT

Disclosed is an air intake manifold including a heat exchanger built into its body and including at least two ducts for supplying and removing heat-exchange liquid, the ducts extending through the wall of the body of the manifold with a liquid-tight seal and an airtight seal, which are distinct and mutually offset along the longitudinal axis of the relevant duct being created on each of the ducts. The unit creating the liquid tight seal is arranged between the relevant duct and a circulation pipe connected to the free end of the duct. The unit creating the airtight seal is positioned between the relevant duct and the body of the distributor. A leakage path associated with the liquid-tight seal is created between the latter and the airtight seal.

17 Claims, 15 Drawing Sheets

(51) Int. Cl.
  *F16L 41/08* (2006.01)
  *F28F 9/02* (2006.01)
  *F28F 21/06* (2006.01)
  *F28D 21/00* (2006.01)

(52) U.S. Cl.
  CPC ............ *F28F 9/0256* (2013.01); *F28F 21/06* (2013.01); *F28D 2021/0082* (2013.01); *F28F 2225/02* (2013.01); *F28F 2230/00* (2013.01); *F28F 2275/20* (2013.01)

(58) Field of Classification Search
  CPC .............. F28F 2230/00; F28F 2275/20; F28D 2021/0082; F16L 41/086
  See application file for complete search history.

(56) References Cited

U.S. PATENT DOCUMENTS

| | | | |
|---|---|---|---|
| 9,038,610 B2 | 5/2015 | Meshenky | |
| 9,587,769 B2* | 3/2017 | Ishikawa | B60H 1/00571 |
| 11,067,202 B2* | 7/2021 | Ortega Gomez | F16L 3/1211 |
| 2005/0023827 A1* | 2/2005 | Walterscheid | F28F 9/0248 |
| | | | 285/124.2 |
| 2008/0129043 A1* | 6/2008 | Holt | F28F 9/0253 |
| | | | 285/212 |
| 2008/0264621 A1* | 10/2008 | Yoshino | F16L 21/035 |
| | | | 165/178 |
| 2012/0210955 A1* | 8/2012 | Keerl | F02B 29/0462 |
| | | | 123/41.56 |
| 2014/0140118 A1* | 5/2014 | Ishikawa | H05K 7/20927 |
| | | | 363/141 |
| 2014/0216385 A1 | 8/2014 | Bruggesser et al. | |
| 2014/0299295 A1 | 10/2014 | Kalbacher et al. | |
| 2014/0300105 A1* | 10/2014 | Kalbacher | F16L 39/00 |
| | | | 285/351 |
| 2015/0152987 A1 | 6/2015 | Ishikawa | |
| 2015/0189790 A1* | 7/2015 | Tachibana | H05K 7/20927 |
| | | | 361/699 |
| 2017/0016685 A1* | 1/2017 | Hohmann | F28F 21/06 |
| 2017/0370504 A1* | 12/2017 | Li | H05H 1/46 |
| 2018/0187814 A1* | 7/2018 | Laule | F16L 21/035 |

FOREIGN PATENT DOCUMENTS

| | | |
|---|---|---|
| DE | 10 2014 202466 A1 | 8/2015 |
| DE | 10 2014 012179 A1 | 2/2016 |
| FR | 2 645 209 A1 | 10/1990 |
| FR | 2 997 134 A1 | 4/2014 |
| JP | 2012 064724 A | 3/2012 |

* cited by examiner

INTAKE MANIFOLD WITH IN-BUILT HEAT EXCHANGER

This invention relates to the field of equipment for automobiles, more particularly the intake manifolds of the latter, and it has as its object an intake manifold with a built-in or integrated heat exchanger, whose fluid-tightness of the circuit for inflow and outflow of liquid to and from the exchanger is improved and made safe.

Many intake manifold designs that incorporate into their interior volume or plenum a liquid heat exchanger are already known, for example by the documents FR 2 645 209 and FR 2 997 134.

The passages of the circuits for inflow and outflow of liquid, between the exchanger and the outside environment, through the wall of the body of the manifold and their connection to external circulation pipes or portions of external circulation pipes constitute areas that are difficult to manage in terms of fluid-tightness and often lead to complex designs.

In fact, it is necessary, in these areas, to form simultaneously an airtight seal with the body of the manifold and a liquid-tight seal with the outside connecting element (pipe or pipe portion).

Known by documents U.S. Pat. No. 9,038,610 and US 2014/0216385 are manifold designs with a built-in exchanger in which only the airtight seal between the connecting pieces (integral with the exchanger or mounted on the latter) and the body of the manifold is mentioned.

In the document US 2014/0299295, a variant (FIG. 2) is envisaged in which a watertight seal and an airtight seal are provided between extension end fittings that are mounted by fitting onto the entry and exit connecting pieces of the exchanger, on the one hand, and an intermediate part located in the body of the manifold and welded onto the exchanger, on the other hand.

However, in this known embodiment with a double seal, no provision is envisaged to prevent any risk of infiltration, introduction or release of liquid into the body of the manifold in case of failure of the liquid-tight seal. In fact, even if the positioning of the airtight seal makes it possible for the latter to be an obstacle to a possible leak of liquid, it is not suitable for this purpose.

In addition, in this known embodiment, the double seal relates to a part, of the end fitting type, mounted on the connecting pieces and not directly on the connecting pieces themselves.

Furthermore, known by the document DE-A-10 2014 202 466 is a manifold with a partially built-in exchanger. Pipes for inflow/outflow of the liquid are connected, by securing by clipping, onto the inflow and outflow connecting pieces of the exchanger (made in the form of adapter parts). A liquid-tight seal is formed between the connecting pieces and the pipe, and an airtight seal is formed between the pipe and the housing of the exchanger, in the area of a part of the latter that is not built into the manifold. The very limited integration of the exchanger in the manifold results in a significant bulkiness of the unit, poor protection of the exposed part of the exchanger, and the management of a complex seal interface between the metallic support plate of the exchanger and the body of the plastic manifold, each subjected to different stresses under the effect of the pressure and temperature variations. In addition, the air circulating in the manifold does not benefit from the heating of the entirety of the exchanger, and the latter does not benefit from the current of forced and channeled air circulating in the manifold.

Known by the document US 2014/0216385 is a manifold with a built-in exchanger. Connecting pieces for the inflow and outflow of the liquid pass through the wall of the housing of the manifold in the area of corresponding passages. A liquid-tight seal is envisaged in this document, in the interior of the housing of the manifold between the connecting pieces and the housing of the exchanger. An airtight seal is envisaged between the walls of the aforementioned passages of the housing of the manifold and the connecting pieces. An optional seal between the connecting pieces and the pipes for inflow and outflow of the liquid is not mentioned in this document.

Known by the document DE-A-10 2009 039 569 is thus a manifold with a built-in exchanger. In this manifold, a double airtight seal is envisaged in the area of the connecting pieces for inflow and outflow of the liquid, between rings that are integral with the connecting pieces and the wall of a cover that is part of the housing of the manifold. No liquid-tight seal is envisaged, nor mentioned.

Finally, also known by the document DE 10 2014 012 179 is a manifold with a built-in exchanger. Connecting pieces for inflow and outflow of the liquid are mounted in passage openings of the housing of the manifold using an airtight seal between the connecting pieces and the openings. However, no specific liquid-tight seal is envisaged in this document.

The current invention has as its object to eliminate the limitations of the state of the art indicated above, by proposing a manifold having a built-in exchanger with a seal for each of the two aforementioned types (liquid, air) in the area of the connecting pieces, while guaranteeing that a possible failure of one of the seals cannot have a detrimental effect on the other, in particular a possible negative effect of a failure of the liquid-tight seal on the airtight seal.

For this purpose, it has as its object an air intake manifold comprising a heat exchanger that is entirely integrated into its body, said heat exchanger being located entirely inside the hollow body of said manifold and having at least two connecting pieces (or stubs) for the inflow and outflow of heat exchange liquid, said connecting pieces extending through the wall of the body of the manifold making, in the area of each of the connecting pieces, a liquid-tight seal and an airtight seal that are separate and mutually offset along the longitudinal axis of the connecting piece respectively under consideration, a manifold characterized in that a means forming the liquid-tight seal is, for each of the connecting pieces or stubs, arranged between the connecting piece and a circulation pipe or extension end fitting that is mounted and connected on the open end of this connecting piece, in that a means forming the airtight seal is positioned between the connecting piece concerned and the body of the manifold or an interface piece assembled in a fluid-tight manner with said body of the manifold, the liquid-tight seal being located, in relation to the interior volume of the body of the manifold, beyond the airtight seal, i.e., more toward the exterior than the latter, and in that a leak path associated with the liquid-tight seal and configured to discharge the liquid leaks to the outside environment is provided between this liquid-tight seal and the airtight seal.

The invention will be better understood as a result of the following description, which pertains to preferred embodiments, given by way of nonlimiting examples and explained with reference to the accompanying diagrammatic drawings, in which.

Figure 1:
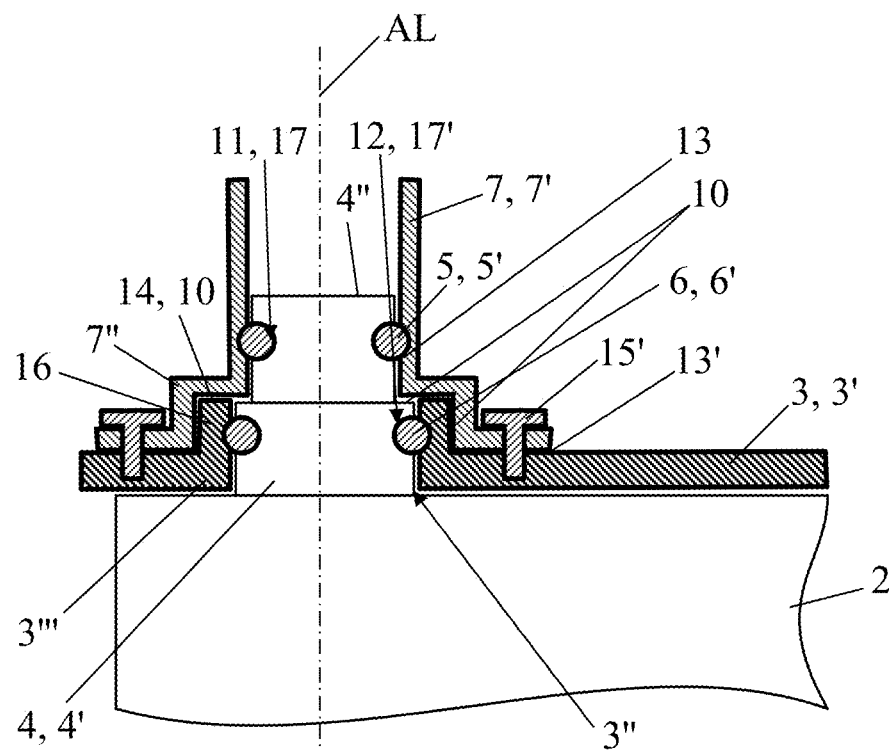
FIG. 1 is a partial diagrammatic representation in section of an intake manifold with a built-in exchanger according to a first embodiment of the invention, illustrating the region of the passages of the connecting pieces or stubs of the exchanger through the wall of the body of the manifold.
Figure 8:
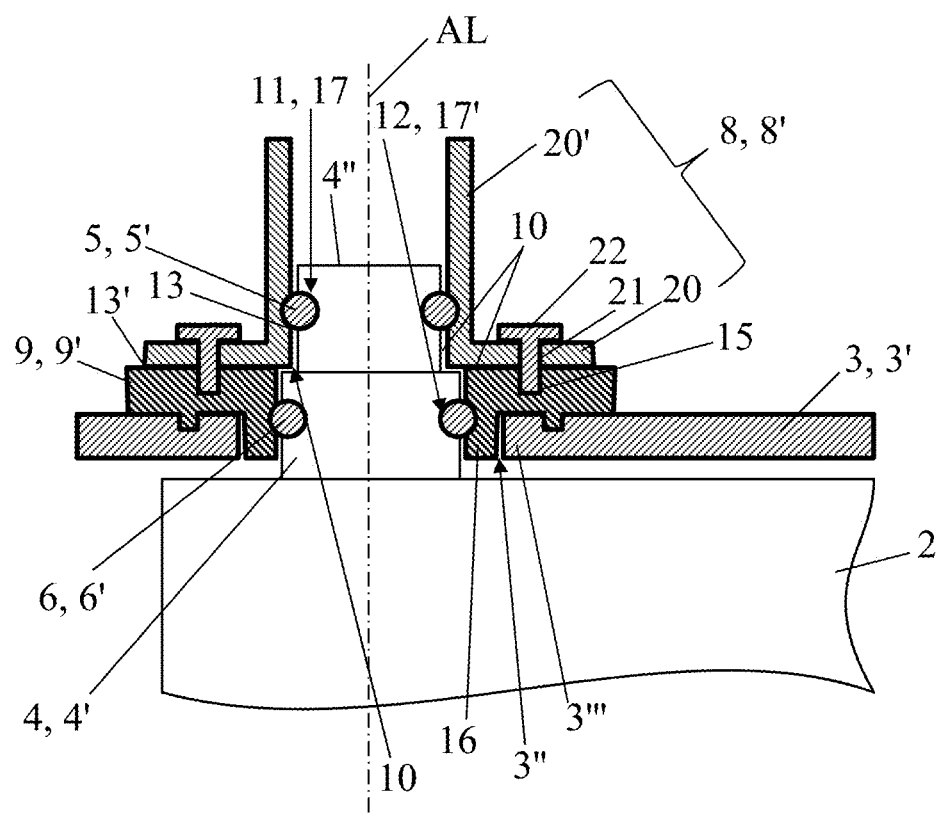
FIG. 8 is a partial diagrammatic representation and in section of an intake manifold with a built-in exchanger according to a second embodiment of the invention, illustrating the region of the passage of a connecting piece of the exchanger through the wall of the body of the manifold.
Figure 2:
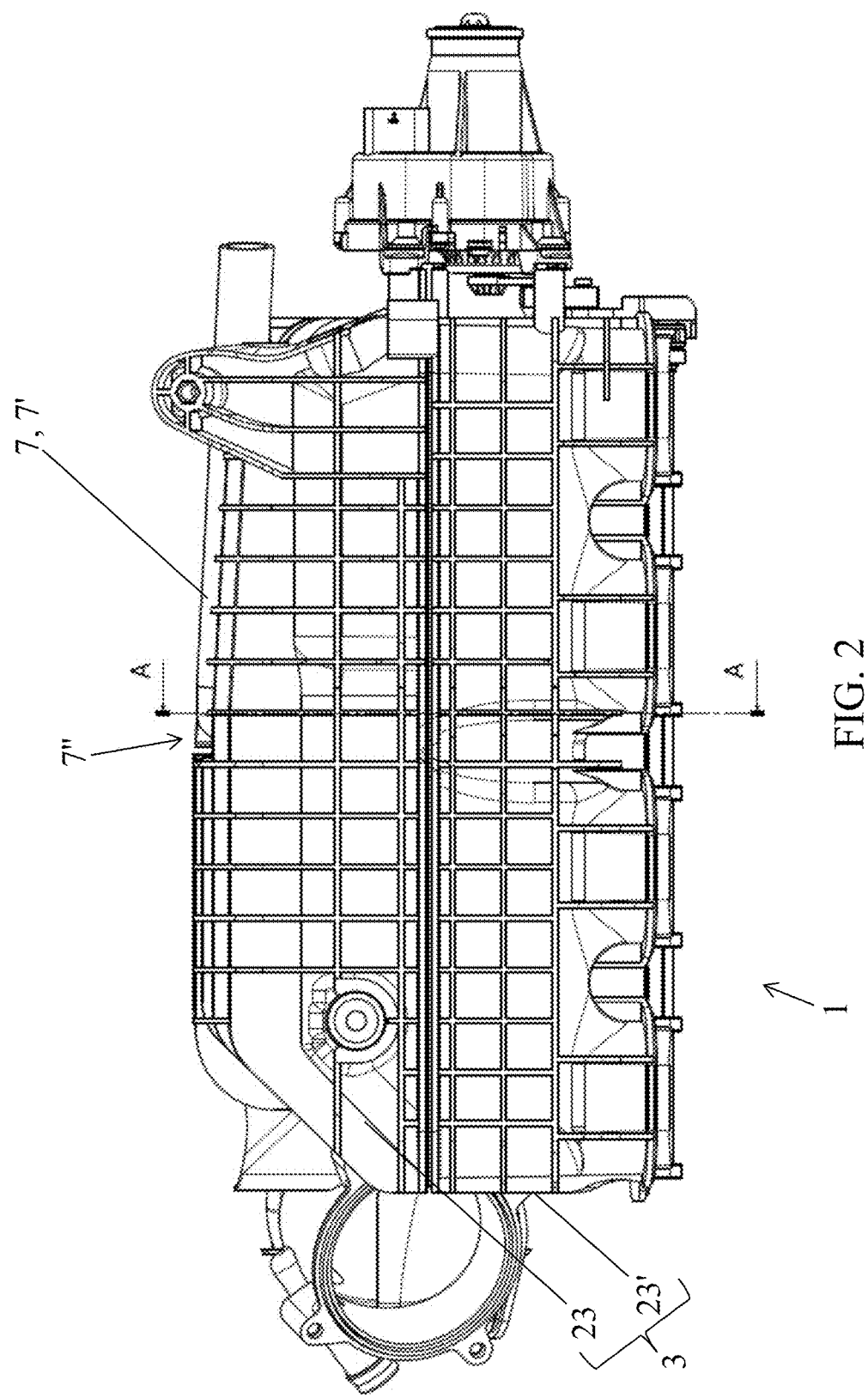
FIG. 2 is a side elevation view of an intake manifold in accordance with a variant of the first embodiment of the invention.
Figure 3:
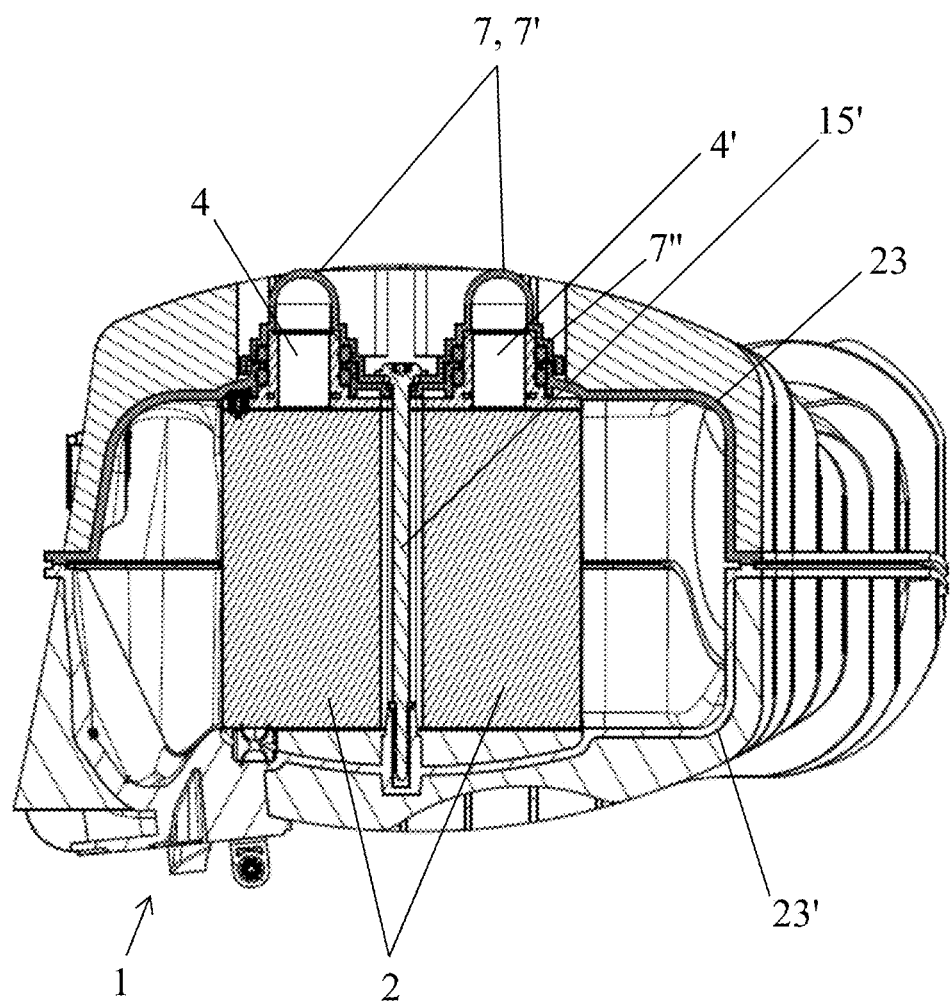
FIG. 3 is a cutaway view along A-A of the manifold shown in FIG. 2.
Figure 4:
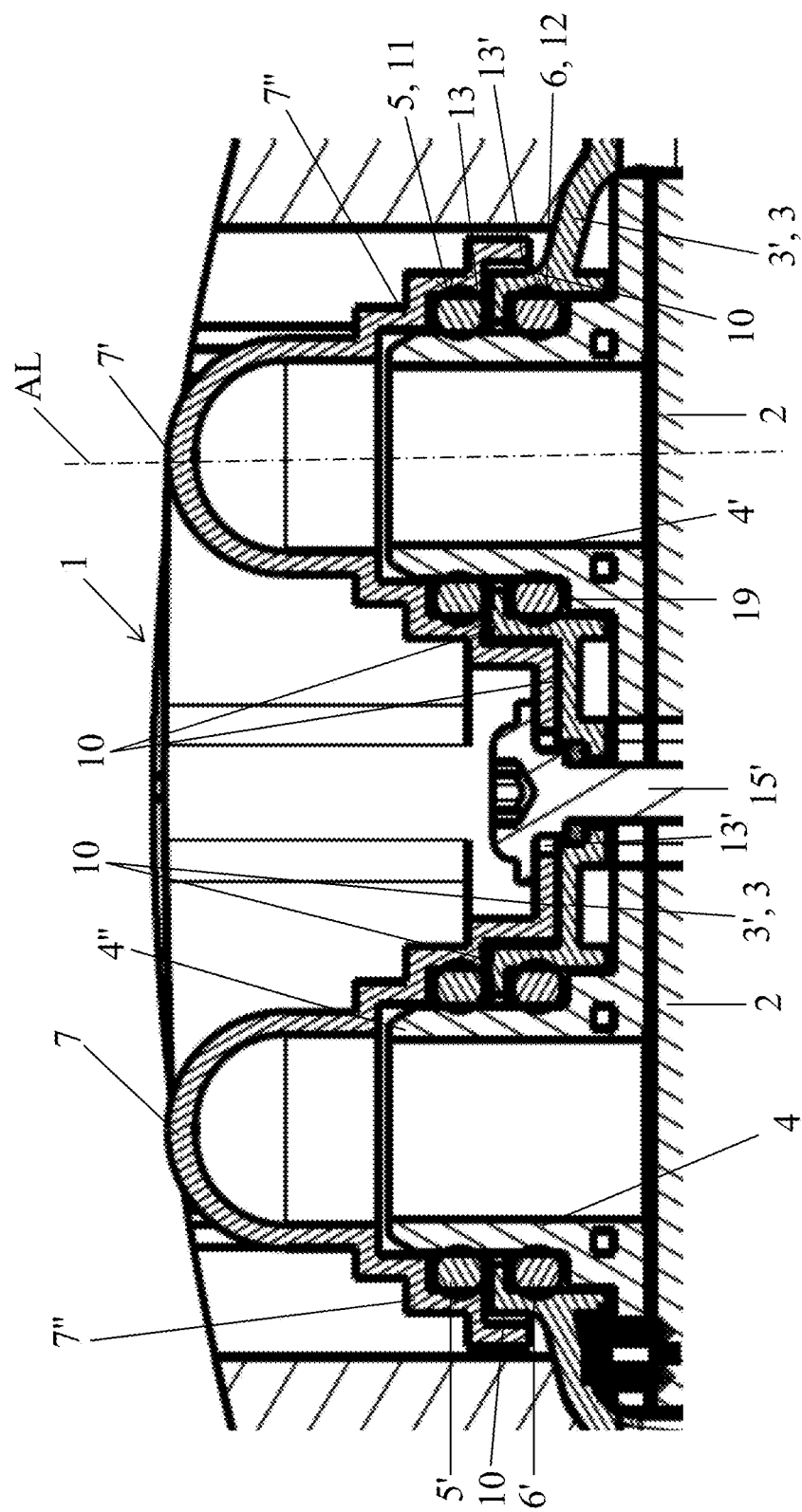
FIG. 4 is a partial detail view and in another scale of the object shown in FIG. 3.

FIGS. 1 to 12 show, at least partially, an air intake manifold 1 comprising a heat exchanger 2 that is entirely (i.e., totally) integrated into its body 3. This heat exchanger 2 is located entirely in the hollow body 3 of said manifold 1 and has at least two connecting pieces 4 and 4' for the inflow and outflow of heat exchange liquid. These connecting pieces 4, 4' extend through the wall 3' of the body 3 of the manifold 1 forming, in the area of each of the connecting pieces, a liquid-tight seal 5 and an airtight seal 6, separate and mutually offset along the longitudinal axis AL of the connecting piece 4, 4' respectively under consideration.

According to the invention, a means 5' forming the liquid-tight seal 5 is, for each of the connecting pieces 4 and 4', arranged between the connecting piece 4, 4' and a circulation pipe 7, 7' or an extension end fitting 8, 8' that is mounted and connected onto the open end 4'' of this connecting piece 4, 4'. In addition, a means 6' forming the airtight seal 6 is positioned between the connecting piece 4, 4' and the body 3 of the manifold 1 or an interface piece 9 assembled in a fluid-tight manner with said body 3 of the manifold 1. The liquid-tight seal 5 is located, in relation to the interior volume of the body 3 of the manifold 1, beyond the airtight seal 6, i.e., more toward the exterior than the latter. Furthermore, a leak path 10 associated with the liquid-tight seal 5 and configured to discharge the liquid leaks to the outside environment is provided between this liquid-tight seal 5 and the airtight seal 6.

As a result of the above-mentioned technical provisions of the invention, the forming of a double seal results directly between each connecting piece 4, 4' of the exchanger 2 and parts contributing to the flow-through circulation from and to the outside of the liquid of the exchanger 2, or to the confined circulation of the air in the manifold 1.

In addition, the liquid-tight seal 5 is offset toward the exterior in relation to the airtight seal 6 and preferably formed outside of the body 3 of the manifold 1, thus preventing—in the case of failure—a leakage of liquid into the interior volume of this body 3.

Finally, foreseeing a leak path 10 for the liquid in case of failure of the liquid-tight seal 5, between the two seals 5 and 6, makes possible an outflow that does not affect the airtight seal 6.

Advantageously, the means forming the leak path 10 are shaped, configured and arranged to discharge the liquid at a distance from the airtight seal 6.

Further, a person skilled in the art of course understands that under conditions of use of the manifold 1, the latter is positioned in such a way that the liquid-tight seal is located above the airtight seal 6, as emerges from the accompanying figures, and so that the leak path 10 extends essentially toward the bottom between its proximal end of the liquid-tight seal 5 and its opening 13 for discharge to the outside.

A person skilled in the art can further easily note that the leak path 10 can also be used as an exhaust path for gases (here, for air) in case of failure of the airtight seal 6 and elimination into the manifold 1, the gas leakage then not stressing the liquid-tight seal 5.

In accordance with an advantageous overall design of the invention, each connecting piece 4, 4' forms every time by cooperation with, on the one hand, the circulation pipe 7, 7' or the associated extension end fitting 8, 8' and, on the other hand, the body 3 of the manifold 1 or the interface piece 9, a receiving housing 11, 12 with compression of the sealing means 5', 6' concerned. In addition, the leak path 10 can then comprise, at its upstream end (according to the direction of flow of the liquid leaks), a discharge opening 13 of the housing 11 that receives the liquid-tight sealing means 5', said opening 13 opening out to the outside environment by the leak path 10 and being located beyond the fluid-tight barrier provided by the liquid-tight sealing means 5', on the exterior side of said barrier.

As emerges from the accompanying figures and according to a preferred practical embodiment, the receiving housings 11, 12 can have annular shapes, preferably with a square or rectangular cross-section, and the sealing means 5', 6' then consist of O-rings. In this case, the discharge openings 13 advantageously consist of passages of the slot or gap type, opening out onto a surface 14 or into a channel 14' for managed flow to the outside of the body 3 of the manifold 1, extending the leak path 10 under consideration.

Each surface 14 or channel 14' for liquid flow extends, in normal position of use of the manifold 1, under the exterior outlet of the opening 13 with which it is associated.

The passages forming the discharge openings 13 of the housings 11 can be localized or extend, optionally continuously, over all or part of the periphery of the corresponding annular housing 11. They present themselves, for example, as slots between a connecting piece 4, 4' and the end sleeve 7'' or the associated extension end fitting 8, 8'. They can also have a more complex shape, such as a baffled slot, with additional cooperation of the body 3 of the manifold or of the interface piece 9 for its shaping.

Of course, a person skilled in the art understands that the O-rings 5' and 6' can consist of distinct materials (rubber, silicone, polymer, . . . ) suited every time to their function.

FIGS. 1 to 7, on the one hand, and FIGS. 8 to 13, on the other hand, illustrate, in a nonlimiting way, two different embodiments of the invention, namely with and without the use of an interface piece 9.

In the embodiment of FIGS. 1 to 7, the external means for inflow and outflow of the heat exchange liquid (here, circulation pipes 7, 7") are attached directly on the body 3 of the manifold.

In the embodiment of FIGS. 8 to 13, the external means for inflow and outflow of the thermal exchange liquid (here, extension end fittings 8, 8') are secured to the body 3 of the manifold by means of at least one interface piece 9 mounted on this body 3. This specific piece 9 can then also contribute to the making of the airtight seal of these connecting pieces 8, 8' in relation to the body 3 of the manifold by reshaping the through passages for said connecting pieces.

In the above-mentioned two embodiments, and as the accompanying drawings illustrate, the leak path 10 appears essentially in the form of a passage, formed specifically in one piece or created indirectly between two pieces when they are assembled, with an upstream entry opening (discharge opening 13 of the housing 11 of the means 5') and a downstream exit opening 13' opening out to the outside environment, i.e., to outside of the body 3 of the manifold 1. Thus, the liquid leaking from the seal 5 has an open discharge route to the outside as an alternative to a passage by the obstacle formed by the airtight seal 6.

The leak path 10 can, for example, result from a non-continuous assembly, for example through areas 15', 22, of the pipe 7, 7' or of the end fitting 8, 8' with the housing 3' or the interface piece 9, allowing an interstitial space to remain, optionally non-continuous, planar or not, between the two assembled pieces (forming the leak path).

Thus, advantageously, the liquid-tight seal 5, which is offset toward the outside in relation to the airtight seal 6, is located outside of the body 3 of the manifold 1, and above the airtight seal 6 in normal use position of the manifold 1. In addition, the leak path 10 extends from the liquid-tight seal 5, while moving away from the connecting piece 4, 4' respectively concerned and, considered overall, downward.

According to a characteristic of the invention, which emerges from FIGS. 8 to 13, the or each interface piece 9 comprises, on the one hand, at least one mounting and attachment site 15 for at least one extension end fitting 8, 8' or circulation pipe 7, 7', and, on the other hand, at least one wall portion 16 constituting a collar and coming outside in relation to the connecting piece 4, 4' respectively concerned to form a receiving housing 12 for an airtight sealing means 6', said or each interface piece 9 being mounted fluid-tight on the body 3 of the manifold 1, in the area of the passage opening or openings 3" for the connecting pieces 4, 4', preferably by welding, bonding or screwing with interpositioning of a seal.

Advantageously, a single interface piece 9 is envisaged for the two connecting pieces 8, 8', arranged in a continuous manner side by side.

As the figures supplied also show, it is advantageously envisaged that the liquid-tight seal 5 is arranged closer to the open end 4" of the connecting piece 4, 4' concerned than the corresponding airtight seal 6 associated with this connecting piece 4, 4', the sealing means 5', 6' being mounted under elastic compression in respective annular receiving housings 11, 12.

These housings 11, 12 are each formed by complementary cooperation with the connecting piece 4, 4' concerned, optionally provided with mounting sites 17, 17' in the form of peripheral grooves or channels, with respectively, on the one hand, an end sleeve 7" of a circulation pipe 7, 7' or a skirt 18 of an extension end fitting 8, 8', and, on the other hand, a collar 16 that is part of the body 3 of the manifold 1 or of an interface piece 9 mounted on the latter, in the area of the passage opening 3" of the connecting piece 4, 4' under consideration through the wall 3' of the body 3 of the manifold 1.

The housings 11, 12, as well as the sealing means 5', 6', are, of course, all arranged concentrically around and along the longitudinal axis AL of the connecting pieces 4, 4' concerned. They can have different diameters (FIGS. 1 and 8) or identical diameters (FIGS. 3, 4, 7, 12 and 13).

In accordance with a first embodiment of the invention, which emerges from FIGS. 1 to 7, it can advantageously be envisaged that in the case of a direct connection between a circulation pipe 7, 7' and a connecting piece 4, 4', the passage opening 3" of the connecting piece 4, 4' in the area of the body 3 of the manifold 1 is provided with a collar 16 having an L cross-section that in upside-down cooperation with a shoulder 19 of the connecting piece 4, 4' defines the annular receiving housing 12 of the airtight seal 6', and the end sleeve 7" of the circulation pipe 7, 7' extends above the edge of the open end 4" of the connecting piece 4, 4' and at least partially above the collar 16 of the passage opening 3" of the body 3 of the manifold 1, by delimiting with said connecting piece 4, 4' and said collar 16 the receiving housing 11 of the liquid-tight seal 5'.

Figure 5:
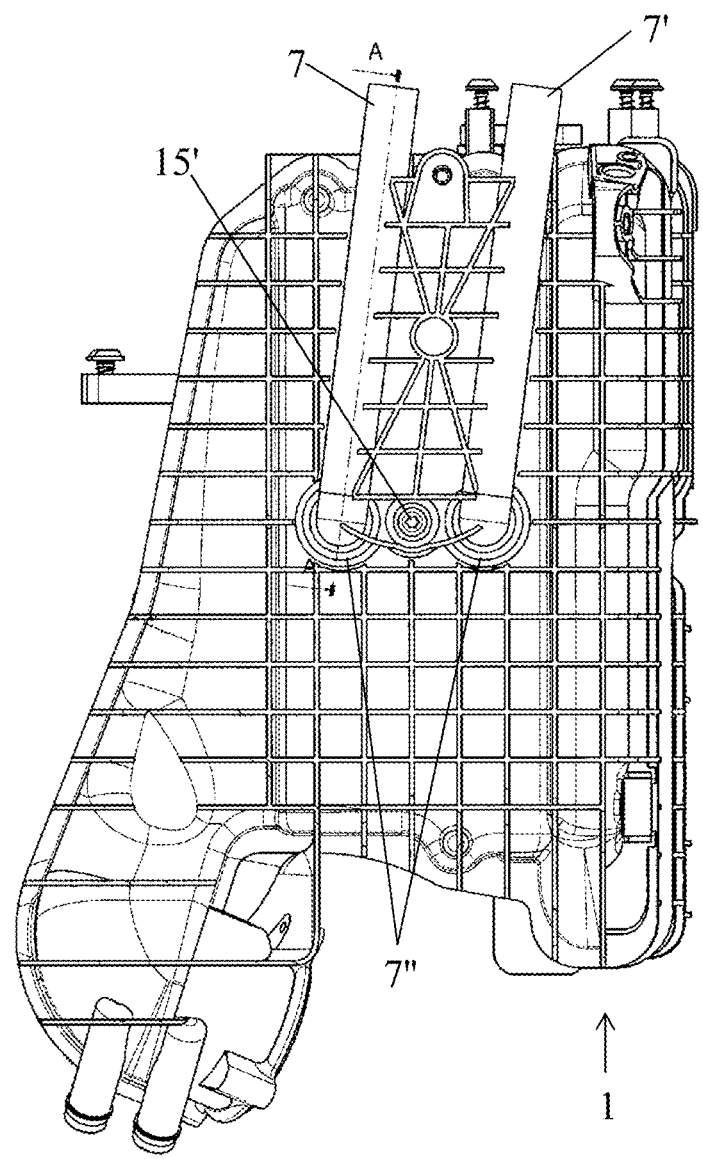
FIG. 5 is a top view of the intake manifold of FIG. 2.
Figure 6:
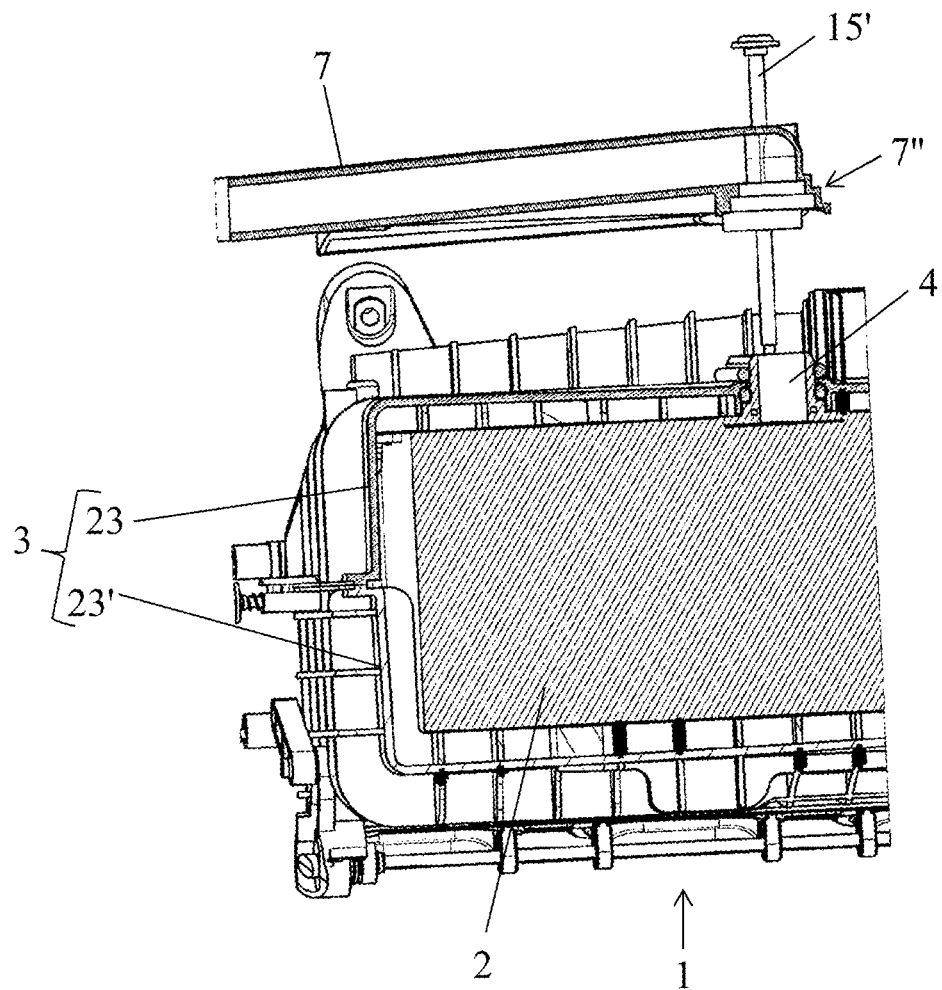
FIG. 6 is a cutaway view along A-A of the manifold shown in FIG. 5, before assembly and connection of the circulation pipes.
Figure 7A:
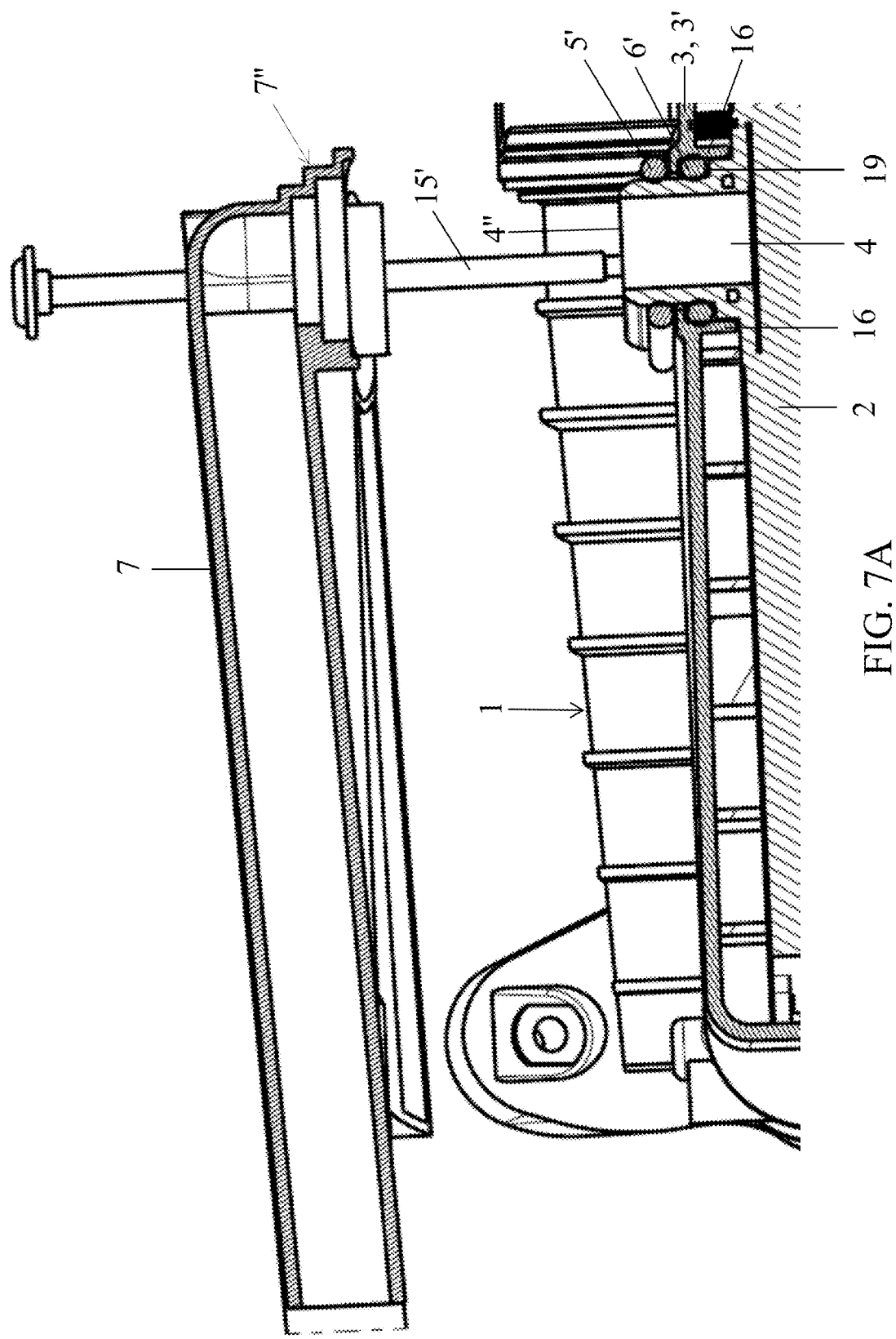
FIG. 7A is a partial detail view and in another scale of the object shown in FIG. 6.
Figure 7B:
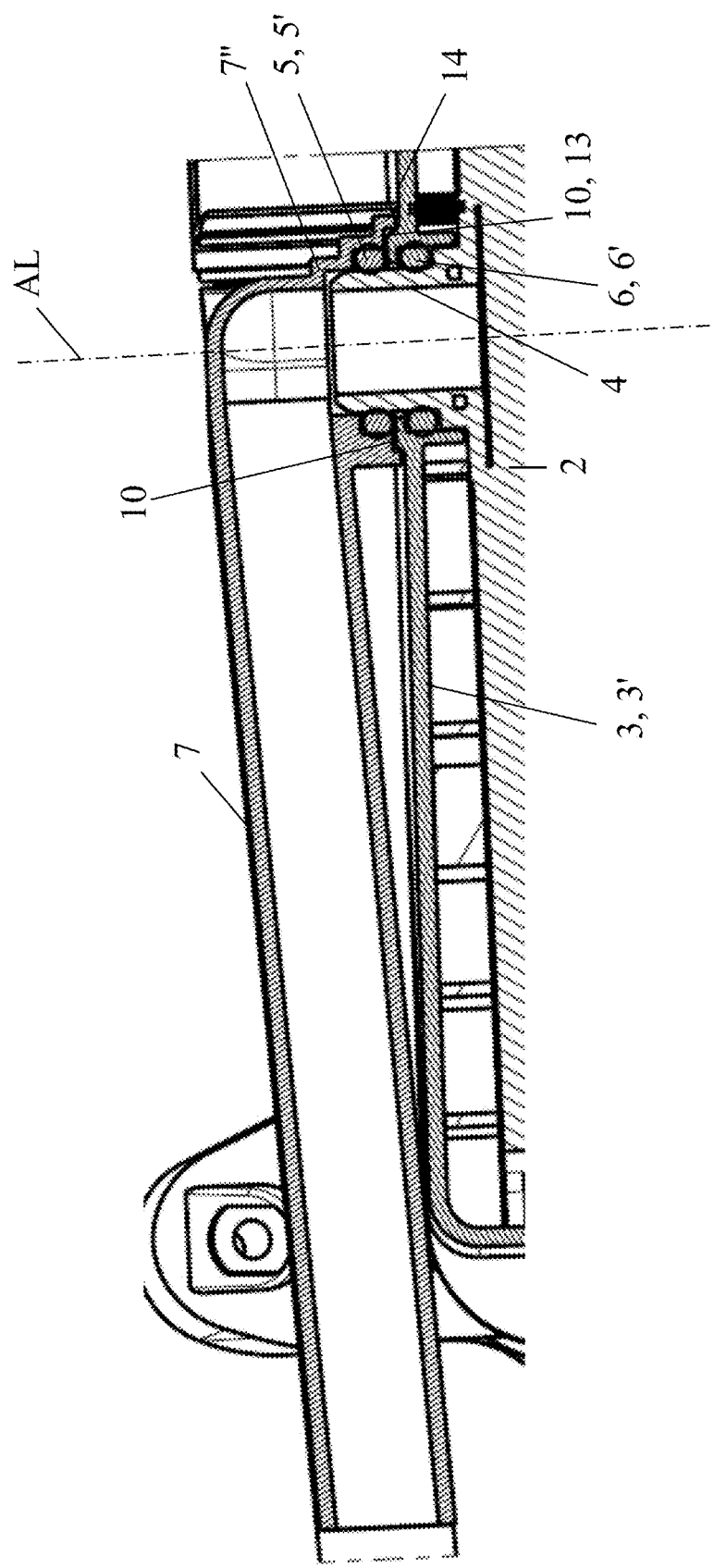
FIG. 7B is a view similar to that of FIG. 7A, the circulation pipes being secured and connected to the connecting pieces of the exchanger.
Figure 9:
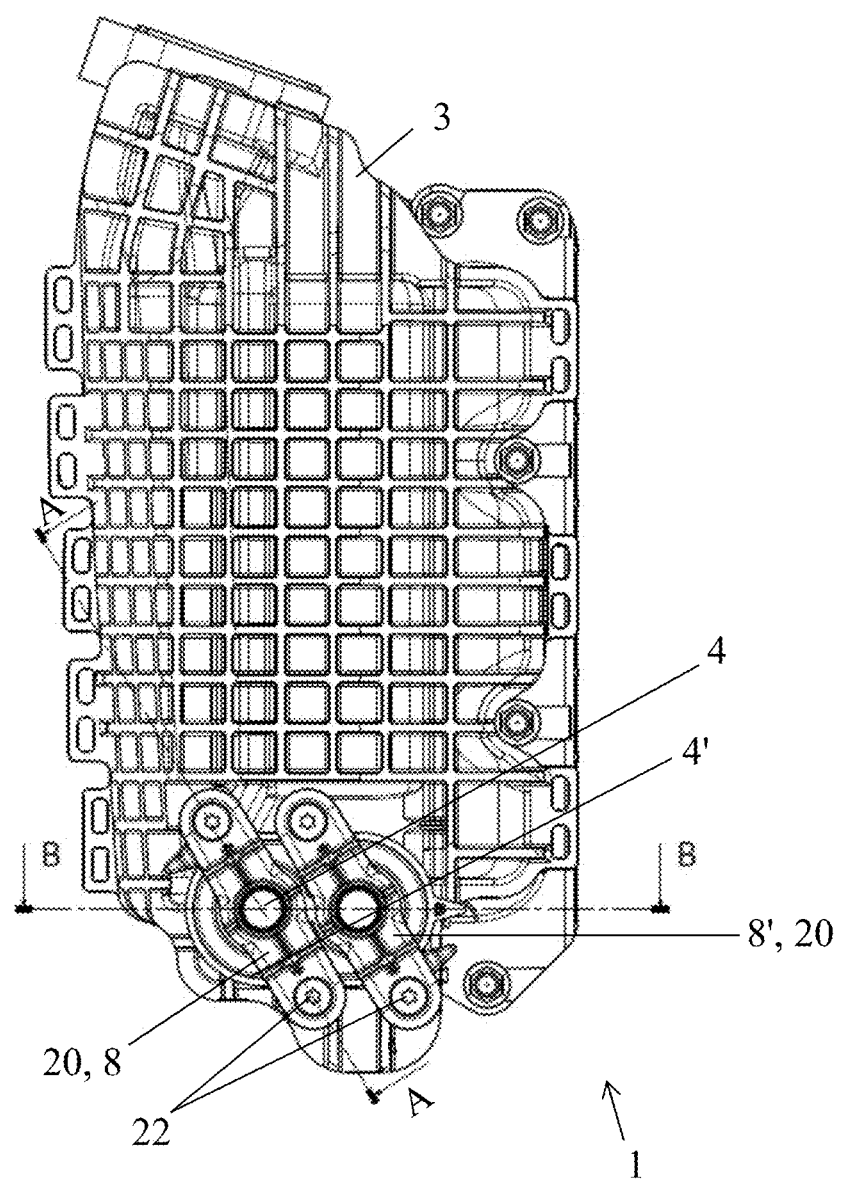
FIG. 9 is a top view of an intake manifold in accordance with a variant of the second embodiment of the invention.
Figure 10:
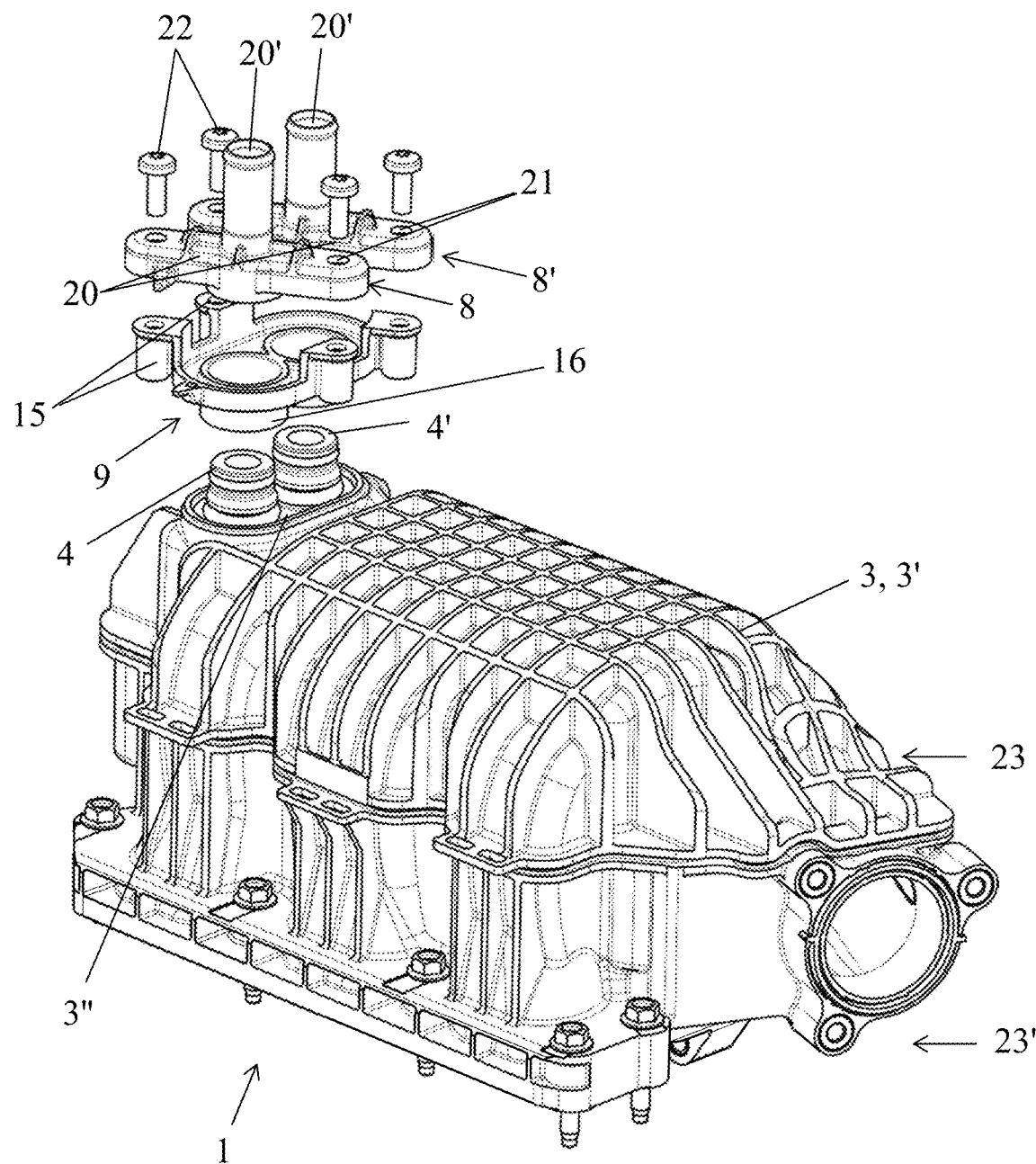
FIG. 10 is a side elevation view and partially exploded view of the manifold shown in FIG. 9.
Figure 11:
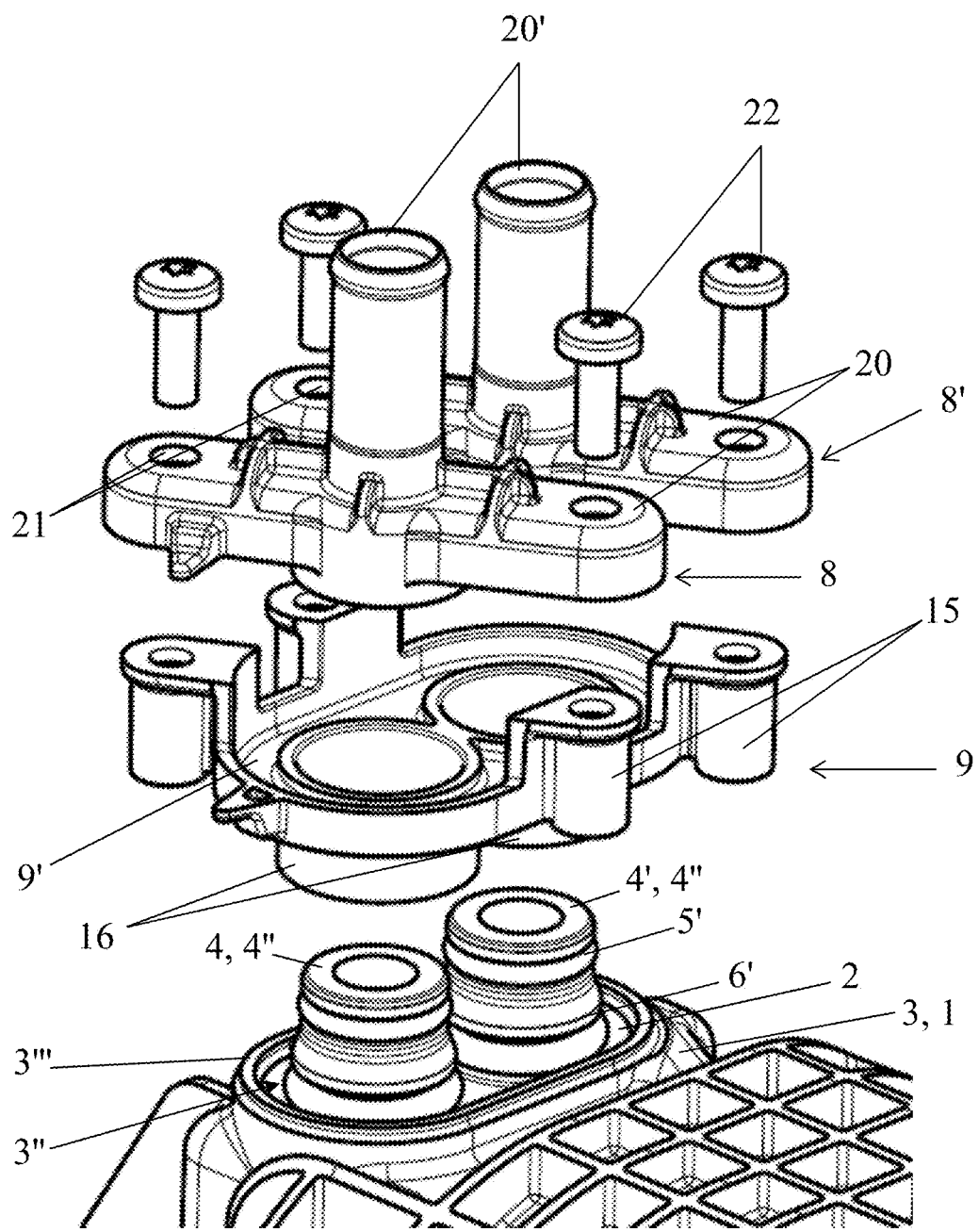
FIG. 11 is a partial detail view and in a different scale of the object shown in FIG. 10.
Figure 12A:
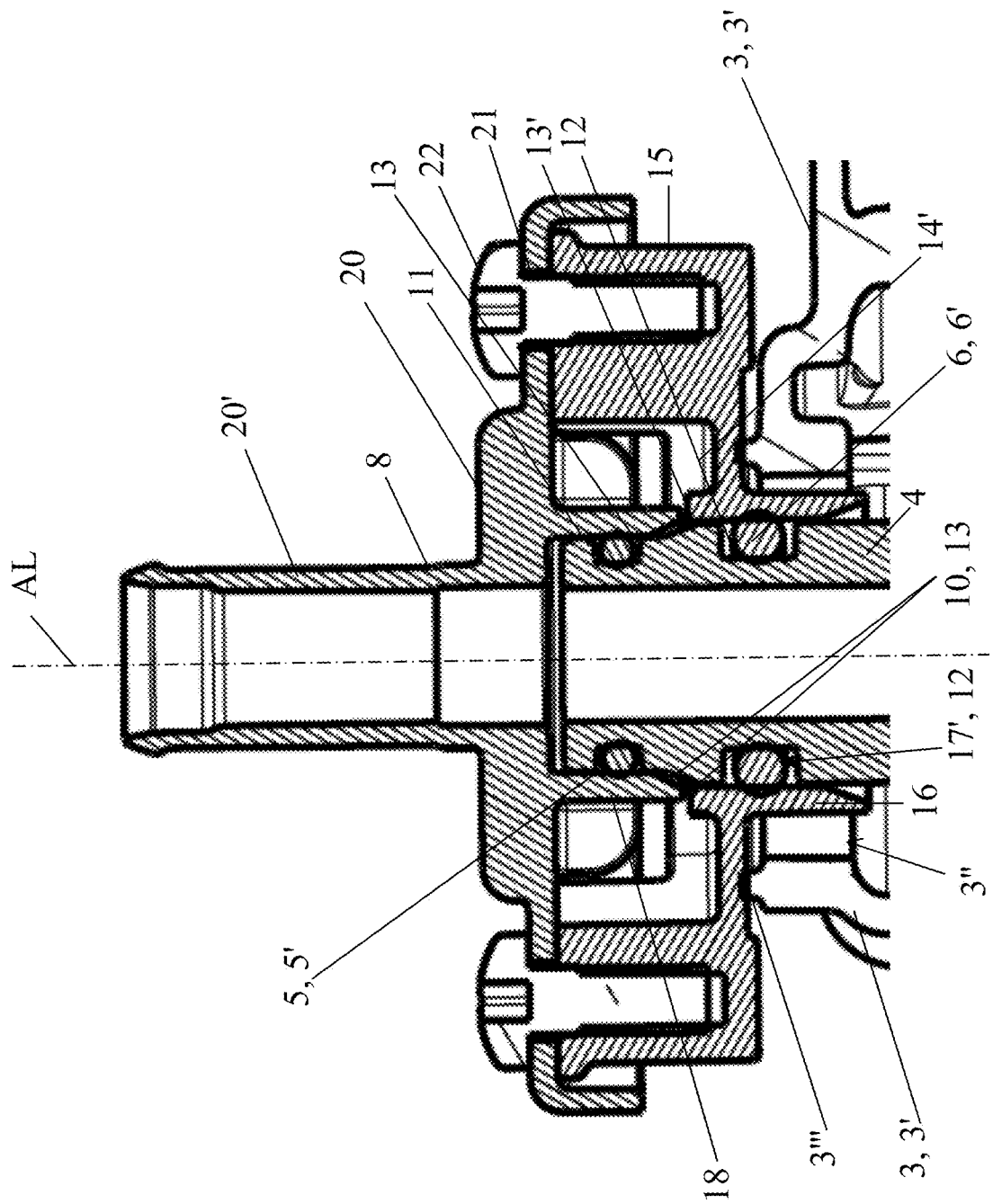
FIGS. 12A and 12B are partial cutaway views respectively along A-A and along B-B of the manifold shown in FIG. 9, and FIGS. 13A and 13B are exploded views of the objects shown respectively in FIGS. 12A and 12B.
Figure 12B:
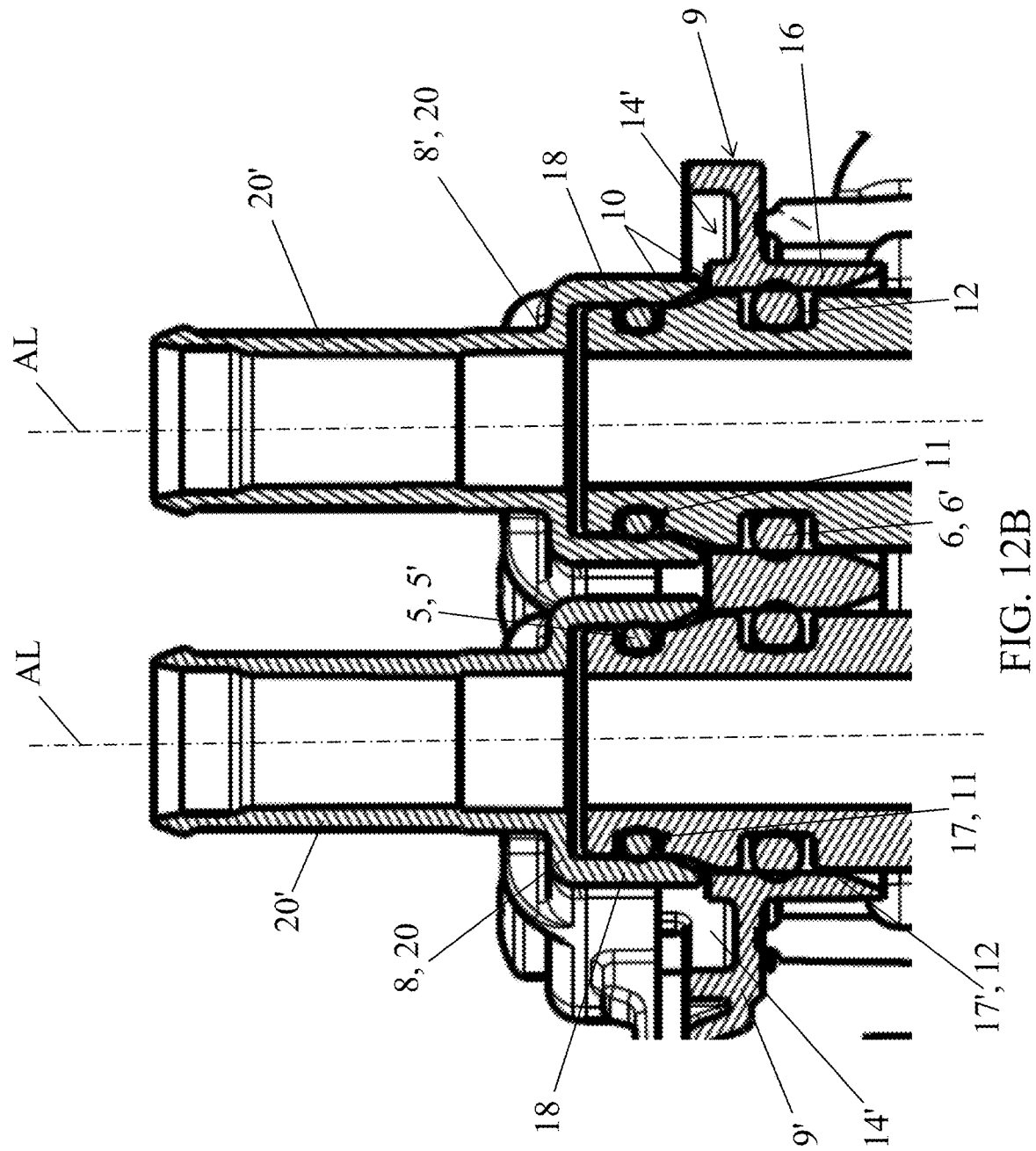
Figure 13A:
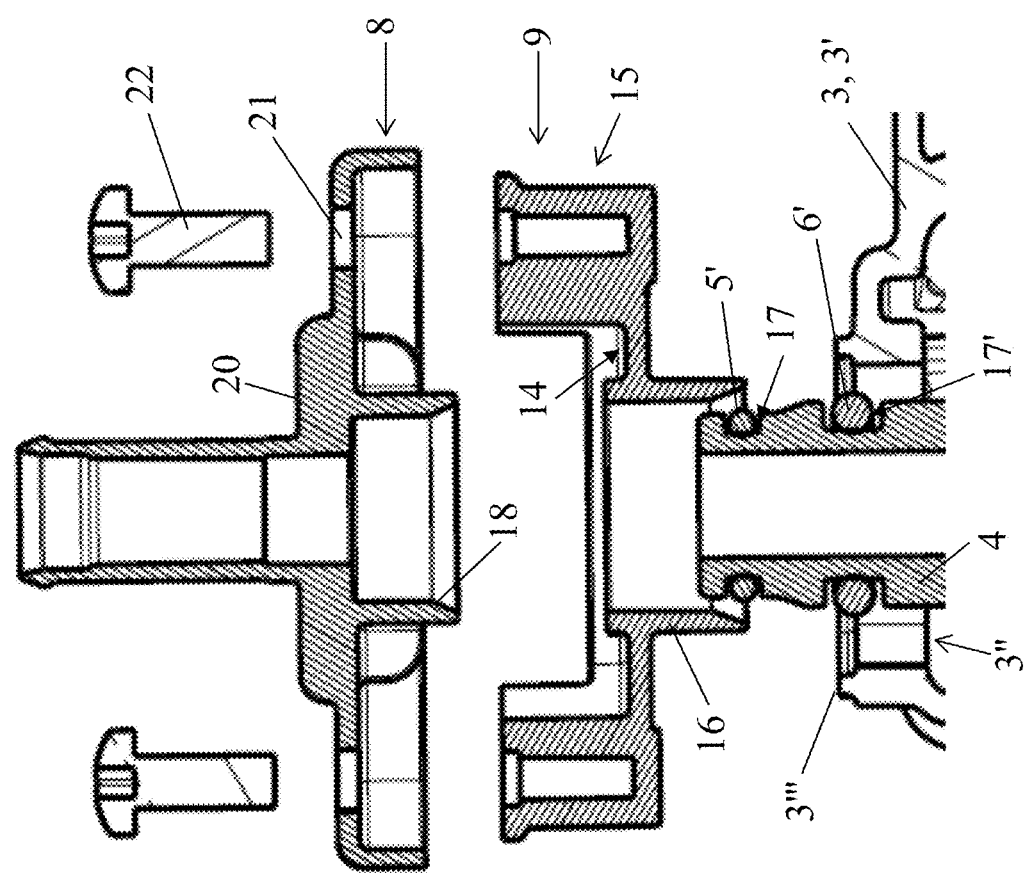
Figure 13B:
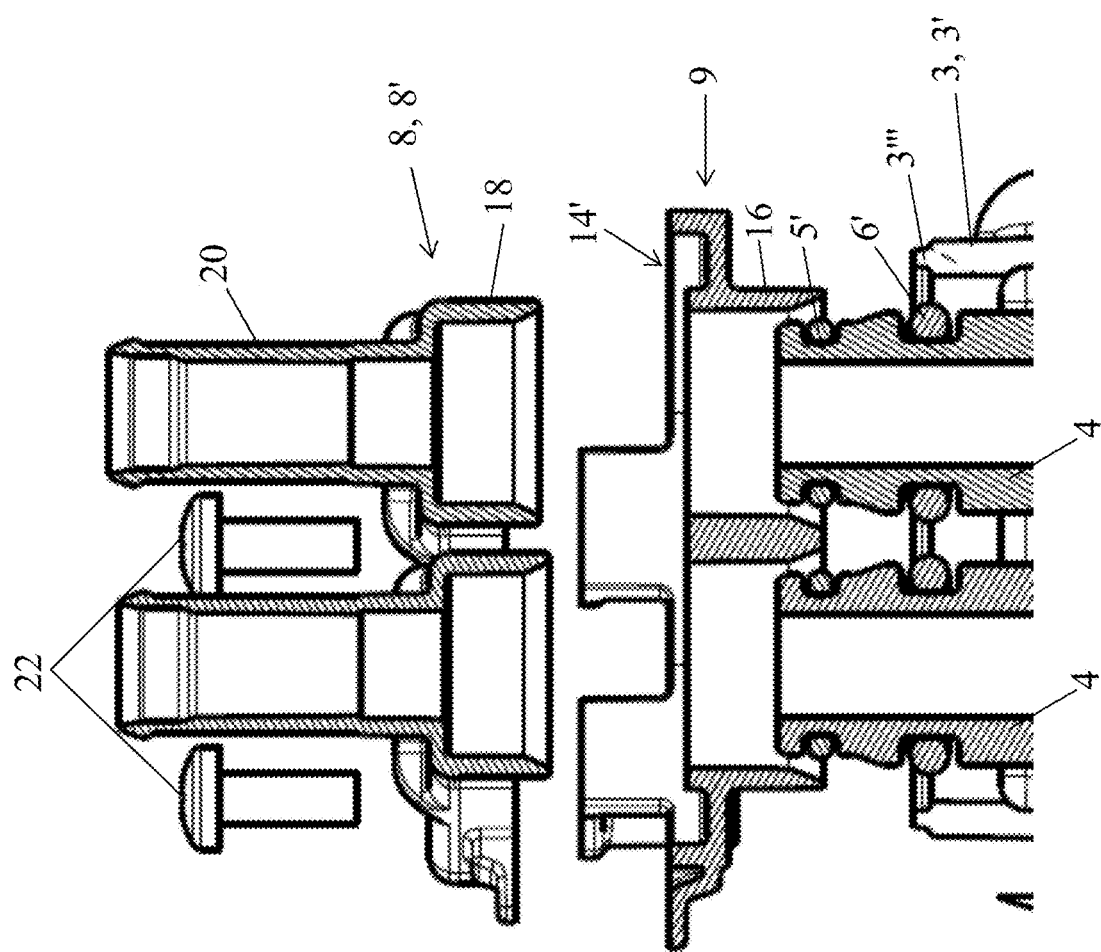

Preferably, and as FIGS. 5 and 6 show, the two circulation pipes 7 and 7' with their respective end sleeves 7" form integrally a single piece, the assembly of this piece 7, 7', 7" with the body 3 of the manifold 1 being locked by, for example, a means 15' of attachment by screwing that engages in said body 3 (FIG. 1).

In accordance with a second embodiment of the invention, which emerges from FIGS. 8 to 13, it can advantageously be envisaged that in the case of the presence of extension end fittings 8 and 8', the common passage opening 3" of the two connecting pieces 4 and 4' through the wall 3' of the body 3 of the manifold 1 is provided with a mechanical and fluidic interface piece 9 comprising a plate-shaped main body 9', secured in a fluid-tight manner with the body 3 of the manifold 1, preferably continuously along the edge 3"' of the common passage opening 3". On this main body 9' are formed, in one piece, on the one hand, mounting and attaching sites 15 for the two extension end fittings 8 and 8', and, on the other hand, cylindrical interior collars 16 that are fitted onto the connecting pieces 4, 4' and extending at least partially into the common passage opening 3", these collars 16 delimiting with the outer surfaces of the connecting pieces 4, 4' receiving housings for the airtight sealing means 6'.

Preferably, each extension end fitting 8, 8' comprises a plate-shaped main body 20 having, in one piece, on the one hand, a cylindrical skirt 18 able and designed to fit onto the open end of a connecting piece 4, 4', while delimiting with the outer face of the latter a receiving housing 11 for a liquid-tight sealing means 5', and, on the other hand, a connection pipe portion 20' that extends away from the collar 16 and whose interior passage has a cross-section identical to that of the corresponding connecting piece 4, 4' and is aligned axially with the interior passage of the latter, said main body 20 being further provided with receiving sites 21 for means 22 of attachment by screwing, coinciding with those of the interface piece 9.

According to an alternative embodiment, the connecting pieces 4, 4' can also extend into the pipe portion 20' of the extension end fittings 8, 8'; the liquid-tight seal 5 is then made between the connecting pieces 4, 4' and the portions 20' (without skirt 18).

According to a characteristic of the invention and whatever the practical embodiment of the leak path 10, there is advantageously envisaged, in the first embodiment, a non-fluid-tight joining between the end sleeve 7" and the body 3 and, in the second embodiment, a non-fluid-tight joining between the end fittings 8, 8' and the interface piece 9.

According to another characteristic of the invention, the body 3 of the manifold 1, the circulation pipes 7, 7', the interface piece 9 and the extension end fittings 8, 8' are made of thermoplastic materials, optionally charged and/or reinforced, the body 3 of the manifold 1 being advantageously made up of the assembly of at least two component parts 23 and 23', each made in one piece by molding, for example.

The invention also relates to an automobile with an internal combustion engine, comprising an air intake system and at least one cooling system, a vehicle characterized in that the air intake system comprises a manifold 1 as described above, the heat exchanger 2 being part of the cooling system.

Of course, the invention is not limited to the embodiments described and shown in the accompanying drawings. Modifications remain possible, particularly from the point of view of the make-up of the various elements or by substitution of technical equivalents, without thereby going outside of the scope of protection of the invention.

The invention claimed is:

1. Air intake manifold (1) comprising a heat exchanger (2) that is entirely integrated into a hollow body (3) of the manifold, said heat exchanger (2) being located entirely inside the hollow body (3) of said manifold (1) and having at least two connecting pieces (4 and 4') for the inflow and outflow of heat exchange liquid, said connecting pieces (4, 4') extending through the wall (3') of the body (3) of the manifold (1) making, in the area of each of the connecting pieces, a liquid-tight seal (5) and an airtight seal (6) that are separate and mutually offset along the longitudinal axis (AL) of the connecting piece (4, 4') respectively under consideration, an interface piece (9) attached to the hollow body (3) of the manifold (1) in a fluid tight manner and through which the connecting pieces (4, 4') pass through, each of the connecting pieces (4, 4') having a corresponding extension end fitting (8, 8') through which their respective connecting piece (4, 4') passes through, each of the extension end fittings (8, 8') having a removable attachment means (22) which fixes their respective extension end fitting (8, 8') to the interface piece (9), wherein a means (5') forming the liquid-tight seal (5) is, for each of the connecting pieces (4 and 4'), arranged between the connecting piece (4, 4') and its respective extension end fitting (8, 8'), a means (6') forming the airtight seal (6) is positioned between the connecting piece (4, 4') and the interface piece (9), the liquid-tight seal (5) being located, in relation to the interior volume of the body (3) of the manifold (1), beyond the airtight seal (6), i.e., more toward the exterior than the latter, and wherein a leak path (10) associated with the liquid-tight seal (5) and configured to discharge the liquid leaks to the outside environment is provided between this liquid-tight seal (5) and the airtight seal (6).

2. Manifold according to claim 1, wherein the liquid-tight seal (5), which is offset toward the outside in relation to the airtight seal (6), is located outside of the body (3) of the manifold (1) and above the airtight seal (6) in normal use position of the manifold (1), and in that the leak path (10) extends from the liquid-tight seal (5), while moving away from the connecting piece (4, 4') respectively concerned and, considered overall, downward.

3. Intake manifold according to claim 1, wherein each of the connecting pieces (4, 4') forms by cooperation with the associated circulation pipe (7, 7'), the associated extension end fitting (8, 8'), and the interface piece (9), the leak path (10) comprising, at its upstream end, a discharge opening (13) of the housing (11) that receives the liquid-tight sealing means (5'), said opening (13) opening out to the outside environment by the leak path (10) and being located beyond the fluid-tight barrier provided by the liquid-tight sealing means (5'), on the exterior side of said barrier.

4. Intake manifold according to claim 3, wherein the receiving housings (11, 12) have annular shapes, and wherein the sealing means (5', 6') consist of O-rings, the discharge openings (13) advantageously consist of passages of the slot or gap type, opening out onto a surface (14) or into a channel (14') for managed flow to the outside of the body (3) of the manifold (1).

5. Intake manifold according to claim 1, wherein the interface piece (9) comprises, for each of the extension end fittings (8, 8'), a mounting and attachment site (15), as well as, for each of the connecting pieces (4, 4'), a wall portion (16) constituting a collar and coming outside in relation to the associated connecting piece (4, 4') to form a receiving housing (12) for the airtight sealing means (6'), said interface piece (9) being mounted fluid-tight on the body (3) of the manifold (1), in the area of at least one passage opening (3") for the connecting pieces (4, 4').

6. Intake manifold according to claim 1, wherein the liquid-tight seal (5) is arranged closer to the open end (4") of the associated connecting piece (4, 4') than the corresponding airtight seal (6), the sealing means (5, 6') being mounted under elastic compression in the respective annular receiving housings (11, 12), each formed by complementary cooperation with the associated connecting piece (4, 4') and, respectively, a skirt (18) of an extension end fitting (8, 8'), or a collar (16) that is part of the interface piece (9) mounted on the body (3), in the area of the passage opening (3") of the associated connecting piece (4, 4').

7. Intake manifold according to claim 3, wherein a common passage opening (3") formed in the body (3) of the manifold (1), through which the connecting pieces (4 and 4) pass, is provided with the interface piece (9) comprising a plate-shaped main body (9'), secured in a fluid-tight manner with the body (3) of the manifold (1), and wherein on the main body (9') of the piece (9) are formed, in one piece, mounting and attaching sites (15) for the extension end fittings (8 and 8'), as well as cylindrical interior collars (16), fitted onto the connecting pieces (4, 4') and extending at least partially into the common passage opening (3"), these collars (16) delimiting with the outer surfaces of the connecting pieces (4, 4') receiving housings for the airtight sealing means (6').

8. Intake manifold according to claim 7, wherein each extension end fitting (8, 8') comprises a plate-shaped main body (20) having, in one piece, both a cylindrical skirt (18) able and designed to fit onto the open end of a connecting piece (4, 4'), while delimiting with the outer face of the latter a receiving housing (11) for a liquid-tight sealing means (5'), as well as a connection pipe portion (20') that extends away from the collar (16) and whose interior passage has a cross-section identical to that of the corresponding connecting piece (4, 4') and is aligned axially with the interior passage of the latter, said main body (20) being further provided with receiving sites (21) for means (22) of attachment by screwing, coinciding with those of the interface piece (9).

9. Intake manifold according to claim 1, wherein the body (3) of the manifold (1), the interface piece (9), and the extension end fittings (8, 8') are made of thermoplastic materials, the body (3) of the manifold (1) being advantageously made up of an assembly of at least two component parts (23, 23').

10. Automobile with an internal combustion engine, comprising an air intake system and at least one cooling system, a vehicle wherein the air intake system comprises a manifold (1) according to claim 1, the built-in exchanger (2) being part of the cooling system.

11. The intake manifold of claim 4, wherein the receiving housings have annular shapes with a square or rectangular cross-section.

12. The intake manifold of claim 5, wherein each said interface piece is mounted on the body of the manifold by welding, bonding or screwing with inter-positioning of a seal.

13. The intake manifold of claim 6, wherein each said connecting piece comprises mounting sites having peripheral grooves or channels.

14. The intake manifold of claim 7, wherein the plate-shaped main body is secured continuously along the edge of the common passage opening.

15. Intake manifold according to claim 2, wherein each of the connecting pieces forms by cooperation with both the associated extension end fitting and the interface piece, the leak path comprising, at its upstream end, a discharge opening of the housing that receives the liquid-tight sealing means, said opening opening out to the outside environment by the leak path and being located beyond the fluid-tight barrier provided by the liquid-tight sealing means, on the exterior side of said barrier.

16. Intake manifold according to claim 2, wherein the interface piece comprises a mounting and attachment site for each of the extension end fittings, as well as a wall portion constituting a collar and coming outside in relation to each of the associated connecting pieces to form a receiving housing for an airtight sealing means, said interface piece being mounted fluid-tight on the body of the manifold.

17. Intake manifold according to claim 3, wherein the interface piece comprises a mounting and attachment site for each of the extension end fittings, as well as a wall portion constituting a collar and coming outside in relation to each of the associated connecting pieces to form a receiving housing for an airtight sealing means, said interface piece being mounted fluid-tight on the body of the manifold.

\* \* \* \* \*